(12) United States Patent
Wilson

(10) Patent No.: US 7,909,076 B2
(45) Date of Patent: Mar. 22, 2011

(54) TIRE PRESSURE CONTROL SYSTEM

(76) Inventor: Seth Wilson, San Clemente, CA (US)

( * ) Notice: Subject to any disclaimer, the term of this patent is extended or adjusted under 35 U.S.C. 154(b) by 0 days.

(21) Appl. No.: 12/644,459

(22) Filed: Dec. 22, 2009

(65) Prior Publication Data

US 2010/0096057 A1 Apr. 22, 2010

Related U.S. Application Data

(63) Continuation of application No. 11/677,903, filed on Feb. 22, 2007, now Pat. No. 7,690,411.

(51) Int. Cl.
*B60C 23/10* (2006.01)
(52) U.S. Cl. ........................ 152/416; 152/415
(58) Field of Classification Search ........... 152/415–418
See application file for complete search history.

(56) References Cited

U.S. PATENT DOCUMENTS

| | | | | |
|---|---|---|---|---|
| 4,019,552 A | * | 4/1977 | Tsuruta | 152/417 |
| 4,154,279 A | * | 5/1979 | Tsuruta | 152/416 |
| 4,685,501 A | * | 8/1987 | Williams | 152/417 |
| 4,705,090 A | * | 11/1987 | Bartos | 152/417 |
| 5,263,524 A | * | 11/1993 | Boardman | 152/416 |
| 5,291,776 A | * | 3/1994 | Mallison | 73/146 |
| 5,587,698 A | * | 12/1996 | Genna | 340/442 |
| 5,629,873 A | * | 5/1997 | Mittal et al. | 702/140 |
| 6,486,771 B1 | * | 11/2002 | Fuller et al. | 340/442 |
| 6,691,754 B1 | * | 2/2004 | Moore | 152/419 |
| 6,744,356 B2 | * | 6/2004 | Hamilton et al. | 340/444 |
| 6,794,993 B1 | * | 9/2004 | Kessler et al. | 340/870.16 |
| 6,894,607 B1 | * | 5/2005 | Claussen et al. | 340/442 |
| 2005/0121125 A1 | * | 6/2005 | Maquaire | 152/415 |
| 2007/0044881 A1 | * | 3/2007 | Skoff | 152/416 |

* cited by examiner

*Primary Examiner* — Russell D Stormer
(74) *Attorney, Agent, or Firm* — QuickPatents, Inc.; Kevin Prince

(57) ABSTRACT

A tire pressure control system for a tire mounted to a wheel of a vehicle is disclosed. The tire pressure control system comprises a servo system mounted to the wheel that includes a servo mechanically connected to a vent valve that is in fluid communication with a gas inside the tire. The vent valve is adapted for bleeding the gas out of the tire and into the ambient atmosphere. A pressure sensor is in fluid communication with the gas inside the tire, and a control circuit is electrically connected to the servo and the pressure sensor. The control circuit further includes a signal receiving means and a memory for storing a commanded pressure signal. The control circuit actuates the servo to open the vent valve when the pressure sensor indicates a tire pressure of greater than the commanded pressure. A master control unit is adapted to transfer the commanded pressure signal to the control circuit through a transmission means. The servo system further includes a second servo mechanically connected to a fill valve that is in fluid communication with compressed gas inside a gas supply tank. The fill valve is adapted for bleeding gas out of the gas supply tank and into the tire. The control circuit actuates the second servo to open the fill valve when the pressure sensor indicates a tire pressure of less than the commanded pressure.

20 Claims, 3 Drawing Sheets

TIRE PRESSURE CONTROL SYSTEM

CROSS-REFERENCE TO RELATED APPLICATIONS

This application is a continuation of application Ser. No. 11/677,903 filed on Feb. 22, 2007 U.S. Pat. No. 7,690,411, issued on Apr. 6, 2010, the entire contents of which are hereby incorporated by reference.

STATEMENT REGARDING FEDERALLY SPONSORED RESEARCH AND DEVELOPMENT

Not Applicable.

FIELD OF THE INVENTION

This invention relates to pressure control systems, and more particularly to a novel tire pressure control system for a vehicle.

DISCUSSION OF RELATED ART

Vehicle tire deflation systems are known in the art, and are particularly well-suited for use with racing vehicles. With such vehicles, tire pressure increases as the vehicles tires heat-up during a race, for example.

Bleeder valves have been used to limit pressure in a tire to a preset upper limit. For example, U.S. Pat. No. 5,257,642 to Worth on Nov. 2, 1993, teaches such a device. One drawback with such a device is that the driver cannot control the set upper limit, and thus as driving conditions change throughout the race the driver cannot override the preset upper limit pressure in such a mechanical device. Thus, if a driver is forced to change such pressure settings, he must pull into the pit and lose valuable racing time. U.S. Pat. No. 5,954,084 to Conroy, Sr. on Sep. 21, 1999, teaches another such device with similar drawbacks.

U.S. Pat. No. 4,582,108 to Markow et al. on Apr. 15, 1986, teaches a device for inflating or deflating tires while the vehicle is in operation. Gas generators and valves on each tire are remotely controlled by the driver. While such a device overcomes the drawbacks associated with the previously mentioned prior art devices, such a device is limited in the number of times it can inflate a tire, due to its use of one-use chemical gas generators. As such, once the gas generators have been exhausted, the driver may no longer inflate his vehicle's tires without stopping to have the gas generators restored. Such gas generators have the drawback that there is inherently little room on a rotating tire, particularly close to the longitudinal axis of the wheel where weight balance of device on the tire has little impact. Clearly, for balance, additional weight added to a rotating wheel must be either insignificant or balanced by additional weight on the other side of the longitudinal axis. Gas generators add weight, and there is typically not enough room on a rotating wheel to provide for compressed gas supply tanks.

U.S. Pat. No. 4,742,857 to Gandhi on May 10, 1988, teaches a somewhat similar system wherein the driver may choose to inflate or deflate specific tires. With such a system a compressed gas reservoir is located on the inner rim of the wheel, and, in an inflation mode, as a wheel-mounted controller passes a solenoid fixed to the vehicle a magnet is moved against the force of a spring so as to open a valve in the reservoir to bleed gas from the reservoir into the tire. Likewise, in a deflation mode, the magnet is moved in an opposite direction so as to open a tire deflating valve. Such inflation or deflation actions occur only when the tire is at a specific rotational point, and as such inflation and deflation occur incrementally, and often not quickly enough as desired by the driver. Further, the compressed gas reservoir adds mass to the rotating wheel, which affects how quickly the vehicle can accelerate and decelerate.

Therefore, there is a need for a vehicle tire inflation and deflation system that is quick-acting, under the driver's complete control, and does not significantly change the weight dynamics of each wheel. Such a needed device would be able to inflate vehicle tires as many times as necessary at least between pit stops, and preferably for an entire race. Further, such a needed device would be easily installed and serviced on existing vehicles. The present invention accomplishes these objectives.

SUMMARY OF THE INVENTION

The present device is a tire pressure control system for a tire mounted to a wheel of a vehicle, such as a racing car, military vehicle, or the like. The tire pressure control system comprises a servo system mounted to the wheel that includes a servo mechanically connected to a vent valve that is in fluid communication with a gas inside the tire. The vent valve is adapted for bleeding the gas out of the tire and into the ambient atmosphere. A pressure sensor is in fluid communication with the gas inside the tire, and a control circuit is electrically connected to the servo and the pressure sensor. The control circuit further includes a signal receiving means and a memory for storing a commanded pressure signal. The control circuit actuates the servo to open the vent valve when the pressure sensor indicates a tire pressure of greater than the commanded pressure. A master control unit is adapted to transfer the commanded pressure signal to the control circuit through a transmission means. Such a transmission means may be a radio signal transmission, for example.

Preferably, the wheel is fixed to a live axle of the vehicle. Further, the servo system further includes a second servo mechanically connected to a fill valve that is in fluid communication with compressed gas inside a gas supply tank. The fill valve is adapted for bleeding gas out of the gas supply tank and into the tire. The control circuit actuates the second servo to open the fill valve when the pressure sensor indicates a tire pressure of less than the commanded pressure.

In one embodiment of the invention, the gas supply tank fits within the live axle, the live axle being at least partially hollow so as to be able to accommodate the gas supply tank. In another embodiment, the live axle is at least partially hollow and itself forms the gas supply tank.

Preferably, each servo is combined into a three-position servo, and each valve is combined into a three-way valve, such that the control circuit may actuate the three-position servo to place the valve into either a position to bleed the gas from the tire into the ambient atmosphere, bleed the gas from the gas supply tank into the tire, or close the valve, as dictated by the commanded pressure and how it relates to the pressure of the gas in the tire detected by the pressure sensor.

The present invention is a vehicle tire inflation and deflation system that is quick-acting and does not significantly change the weight dynamics of any wheel. Such a device provides the driver of the vehicle complete pneumatic control over the pressure of each tire in real time. Further, the present device allows the driver to inflate the vehicle tires as many times as necessary for an entire race. Moreover, the present invention is easily installed and serviced on existing vehicles. Other features and advantages of the present invention will become apparent from the following more detailed descrip-

DETAILED DESCRIPTION OF THE PREFERRED EMBODIMENT

Figure 1:
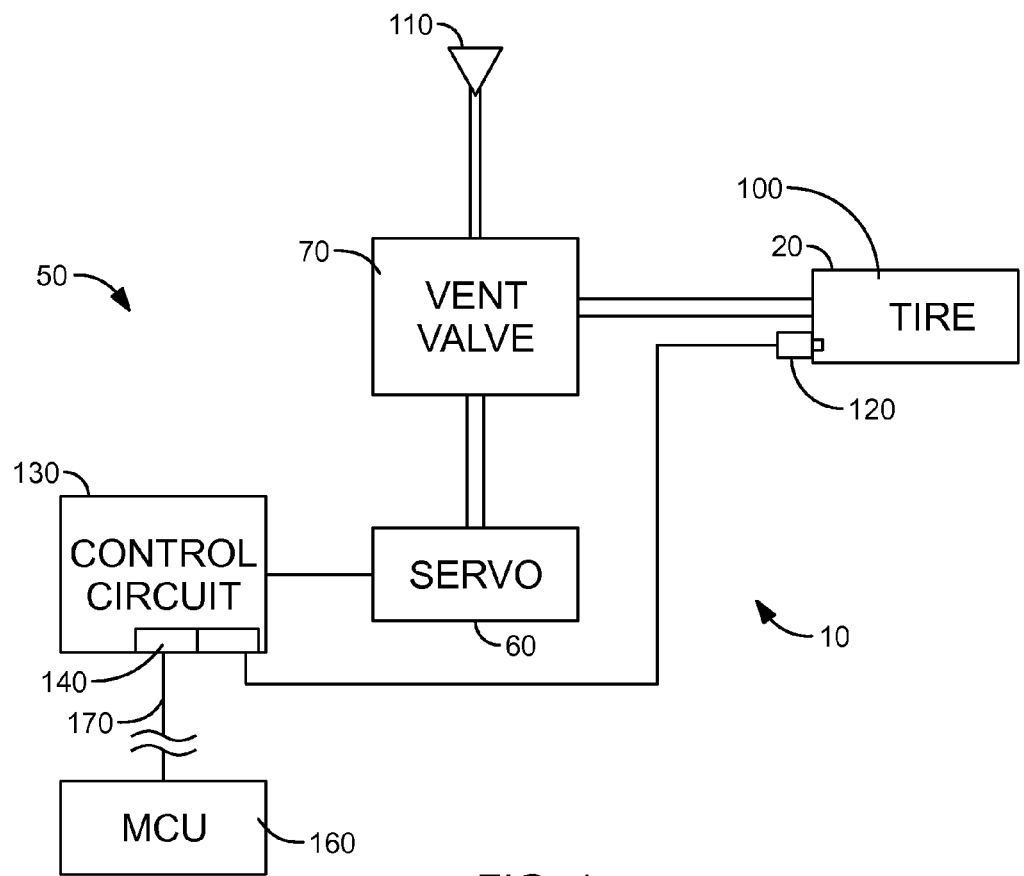
FIG. 1 is a functional block diagram of a tire pressure control system of the present invention.
Figure 7:
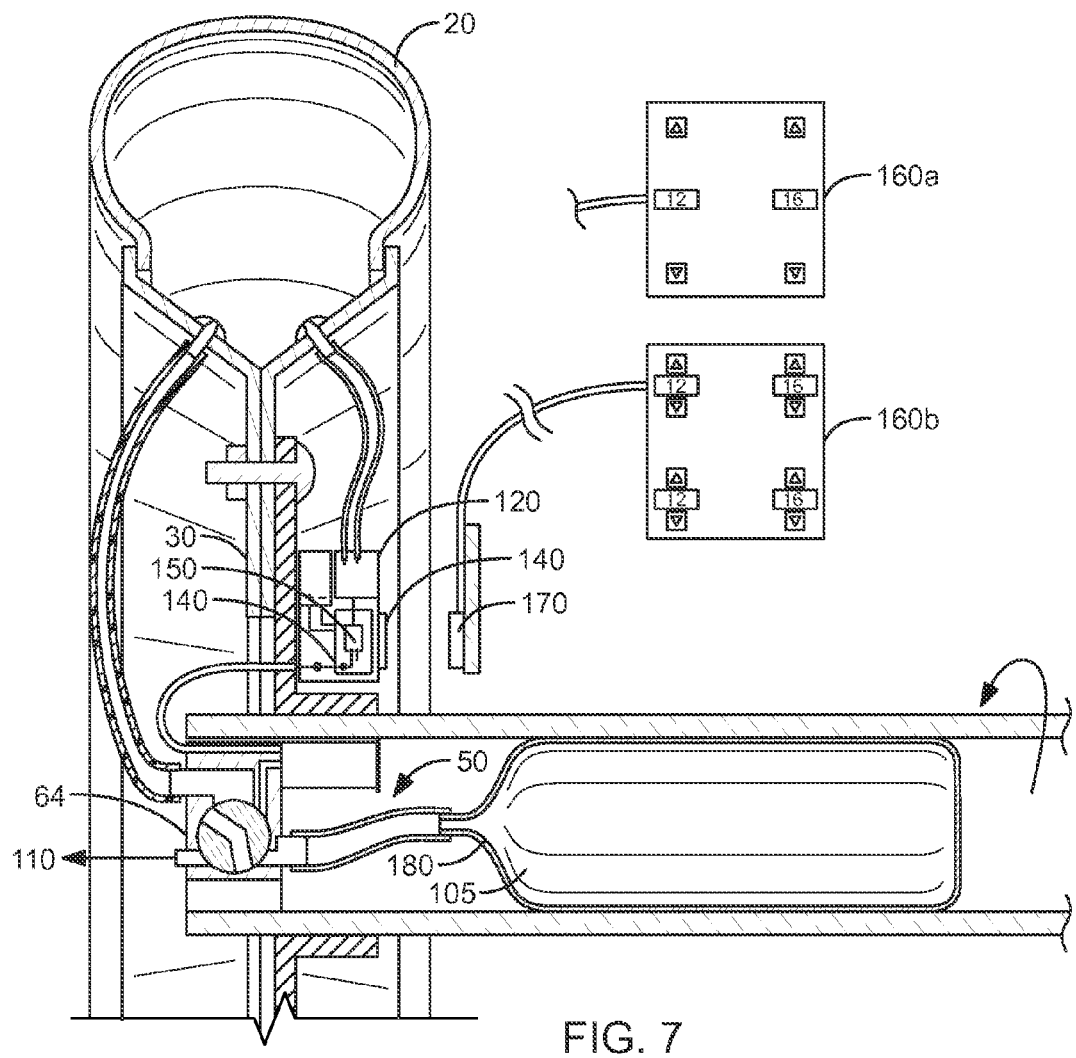
FIG. 7 is a cross-sectional view of a wheel and tire of a vehicle having the tire pressure control system of the present invention.

FIGS. 1 and 7 illustrate a tire pressure control system 10 for a tire 20 mounted to a wheel 30 of a vehicle 15, such as a racing car, military vehicle, or the like. The tire pressure control system 10 comprises a servo system 50 mounted to the wheel 30 that includes a servo 60 mechanically connected to a vent valve 70 that is in fluid communication with a gas 100 inside the tire 20. The vent valve 70 is adapted for bleeding the gas 100 out of the tire 20 and into the ambient atmosphere 110.

A pressure sensor 120 is in fluid communication with the gas 100 inside the tire 20, and a control circuit 130 is electrically connected to the servo 60 and the pressure sensor 120. The control circuit 130 further includes a signal receiving means 140 and a memory 150 for storing a commanded pressure signal. The control circuit 130 actuates the servo 60 to open the vent valve 70 when the pressure sensor 120 indicates a tire pressure of greater than the commanded pressure.

Figure 4:
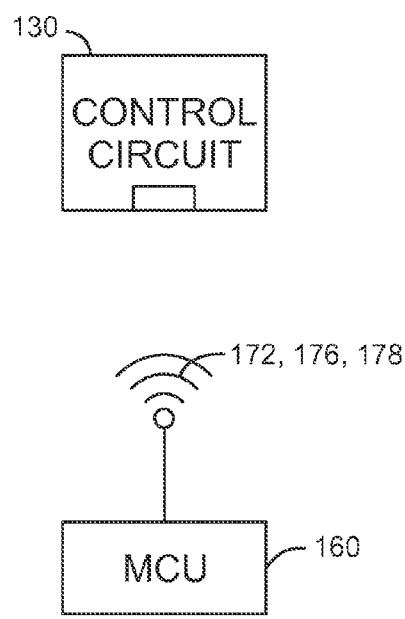
FIG. 4 is a functional block diagram of a transmission means of the tire pressure control system of the present invention.
Figure 5:
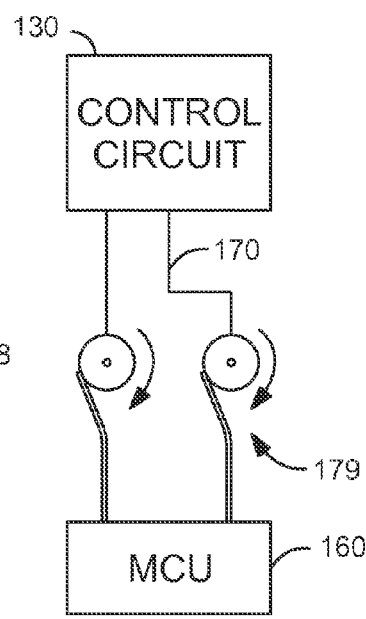
FIG. 5 is a functional block diagram of an alternate transmission means of the tire pressure control system of the present invention.
Figure 6:
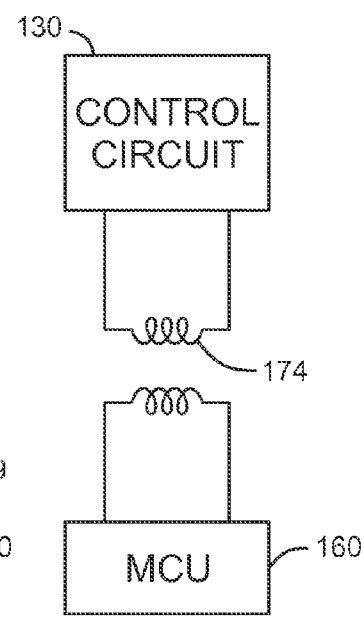
FIG. 6 is a functional block diagram of another alternate transmission means of the tire pressure control system of the present invention.

A master control unit 160a (FIG. 7) is adapted to transfer the commanded pressure signal to the control circuit 130 through a transmission means 170. Such a transmission means 170 may be a radio signal transmission means 172 (FIG. 4), a magnetic coupling signal transmission means 174 (FIG. 6), an ultrasonic signal transmission means 176 (FIG. 4), an optical signal transmission means 178 (FIG. 4), such as through infrared or the like, or a mechanical brush and rotor signal transmission means 179 (FIG. 5), for example. The master control unit 160a, in one embodiment of the invention, includes at least two channels for sending two independent commanded pressure signals to servo systems 50 mounted to wheels 30 on at least two sides of the vehicle 15. As such, the driver may command a slightly lower pressure for the tires 20 on the left side of the vehicle 15, for example, if the vehicle 15 is racing around a track in a counter-clockwise direction. In another embodiment of the invention, a master control unit 160b includes at least four channels for sending four independent commanded pressure signals to servo systems 50 mounted to each of four wheels 30 of the vehicle 15. In such an embodiment, each tire 20 may be set to an independent pressure.

In the simplest embodiment of the invention, the master control unit 160 is fixed to the tire 20, rotating therewith, and the transmission means 170 is simply a wire (FIG. 1). As such, the commanded pressure is set at the tire 20, such as by a pit crew or the like (not shown), and the driver cannot change the set commanded pressure when the vehicle 15 is moving. Such an embodiment is significantly better than the prior art devices at bleeding the gas 100 out of tire 20 to accurately achieve the commanded pressure when the pressure sensor 120 detects that the tire pressure is higher than the commanded pressure, particularly at low commanded pressures.

Figure 2:
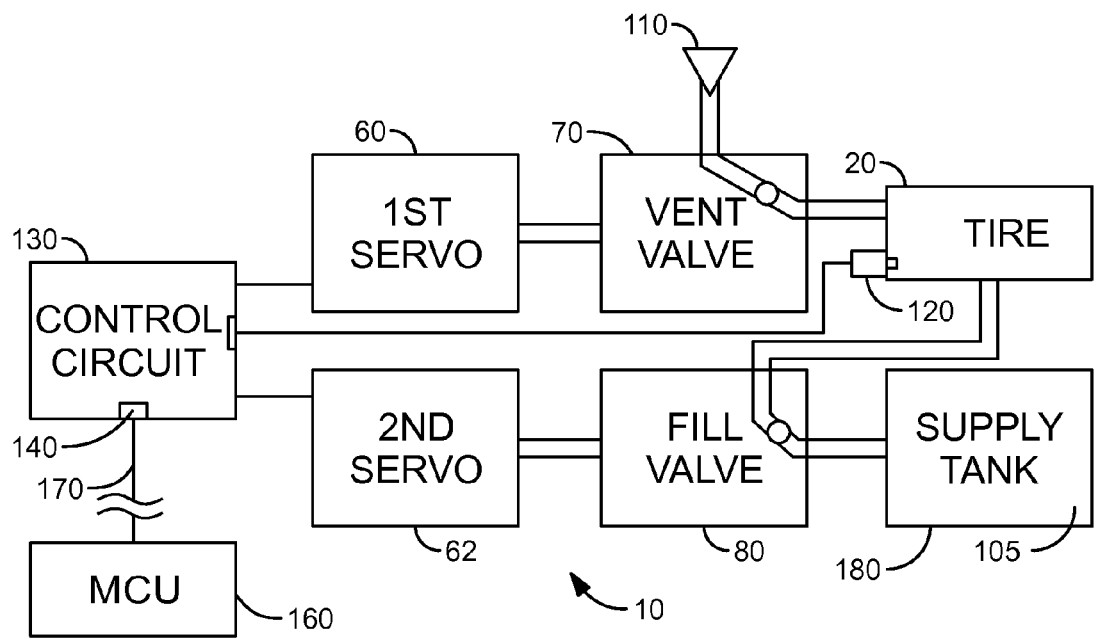
FIG. 2 is a functional block diagram of an alternate embodiment of the tire pressure control system of the present invention.
Figure 3:
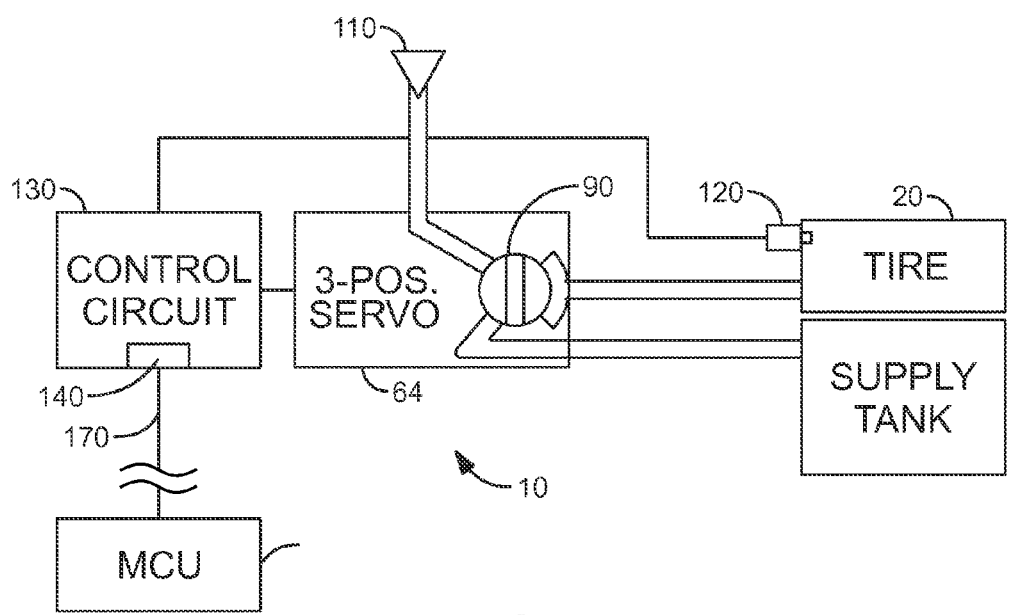
FIG. 3 is a functional block diagram of another alternate embodiment of the tire pressure control system of the present invention.

Preferably, however, as illustrated in FIGS. 2, 3, and 7, the wheel 30 is fixed to a live axle 40 of the vehicle 15. Further, the servo system 50 further includes a second servo 62 mechanically connected to a fill valve 80 that is in fluid communication with compressed gas 105 inside a gas supply tank 180. The fill valve 80 is adapted for bleeding gas 100 out of the gas supply tank 180 and into the tire 20. The control circuit 130 actuates the second servo 62 to open the fill valve 80 when the pressure sensor 120 indicates a tire pressure of less than the commanded pressure.

Figure 8:
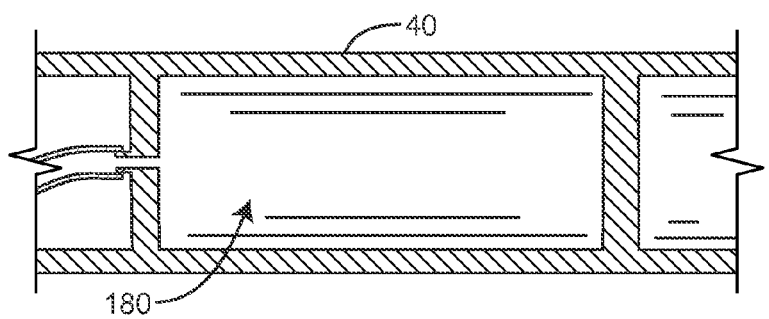
FIG. 8 is a partial cross-sectional view of an alternate embodiment wherein the axle itself forms a gas supply tank.

In one embodiment of the invention, the gas supply tank 180 fits within the live axle 40, the live axle 40 being at least partially hollow so as to be able to accommodate the gas supply tank 180. In another embodiment, the live axle 40 is at least partially hollow and itself forms the gas supply tank 180 (FIG. 8).

Preferably, as illustrated in FIGS. 3 and 7, the servo 60 is a three-way servo 64 that has at least three positions and mechanically connects to a valve 90 having at least three positions. The valve 90 is in fluid communication with the gas 100 inside the tire 20, with the compressed gas 100 within the gas supply tank 180, and with the ambient atmosphere 110. As such, with the gas supply tank 180 fixed inside the live axle 40, the valve 90 is adapted for bleeding gas out of the tire 20 and into the ambient atmosphere in a first position corresponding to a first servo position. The valve 90 is further adapted for bleeding gas 100 out of the gas supply tank 180 and into the tire 20 in a second position corresponding to a second servo position. Finally, the valve 90 is adapted for sealing the gas 100 within the tire 20 and within the gas supply tank 180 in a third, closed position corresponding to a third servo position.

In such an embodiment, the control circuit 130 actuates the servo 64 to assume the first servo position when the pressure sensor 120 indicates a tire pressure of greater than the commanded pressure. The control circuit 130 further actuates the servo 64 to assume the second servo position when the pressure sensor 120 indicates a tire pressure of less than the commanded pressure. The control circuit 130 further actuates the servo 64 to assume the third, closed position when the pressure sensor 120 indicates a tire pressure substantially at the commanded pressure.

All of the components are balanced around the longitudinal axis of the axle 40, so that the system 10 is balanced during rotation of the tire 20. The gas supply tank 180 is preferably co-axially aligned with the axle 40, and each servo 60,62 is preferably located equidistant from the longitudinal axis of the axle 40.

While a particular form of the invention has been illustrated and described, it will be apparent that various modifications can be made without departing from the spirit and scope of the invention. For example, the exact placement of the servo system 50 and the valves 70, 80, 90 with respect to each wheel 30, and the type of transmission means 170 used, may all vary as necessary for each type of vehicle 15. Accordingly, it is not intended that the invention be limited, except as by the appended claims.

What is claimed is:

1. A tire pressure control system for a tire mounted to a wheel, comprising:
   a servo system mounted to the wheel and including a servo mechanically connected to a valve in fluid communication with gas inside the tire, the valve adapted for bleeding gas out of the tire and into the ambient atmosphere, a pressure sensor in fluid communication with the gas inside the tire, and a control circuit electrically connected to the servo and pressure sensor, the control circuit further including a signal receiving means and a memory for storing a commanded pressure signal, the control circuit actuating the servo to open the valve when the pressure sensor indicates a tire pressure of greater than the commanded pressure;
   the servo system further including a second servo mechanically connected to a fill valve that is in fluid communication with compressed gas inside a gas supply tank, the fill valve adapted for bleeding gas out of the gas supply tank and into the tire, the control circuit actuating the second servo to open the fill valve when the pressure sensor indicates a tire pressure of less than the commanded pressure; and
   a master control unit adapted to transfer the commanded pressure signal to the control circuit through a transmission means.

2. The tire pressure control system of claim 1, wherein the wheel is fixed to a live axle and the gas supply tank is fixed inside the live axle.

3. The tire pressure control system of claim 1, wherein the wheel is fixed to a live axle, the live axle being substantially hollow and gas-impermeable, and itself forms the gas supply tank.

4. The tire pressure control system of claim 1, wherein the master control unit includes at least two channels for sending two independent commanded pressure signals to servo systems mounted to wheels on at least two sides of a vehicle.

5. The tire pressure control system of claim 1, wherein the master control unit includes at least four channels for sending four independent commanded pressure signals to servo systems mounted to at least four wheels of a vehicle.

6. The tire pressure control system of claim 1, wherein the transmission means is a radio signal transmission means.

7. The tire pressure control system of claim 1, wherein the transmission means is a magnetic coupling signal transmission means.

8. The tire pressure control system of claim 1, wherein the transmission means is an ultrasonic signal transmission means.

9. The tire pressure control system of claim 1, wherein the transmission means is an optical signal transmission means.

10. The tire pressure control system of claim 1, wherein the transmission means is a wire and the master control unit is fixed to the tire.

11. A tire pressure control system for a tire mounted to a wheel, comprising:
    a servo system mounted to the wheel and including a servo mechanically connected to a valve in fluid communication with gas inside the tire, the valve adapted for bleeding gas out of the tire and into the ambient atmosphere, a pressure sensor in fluid communication with the gas inside the tire, and a control circuit electrically connected to the servo and pressure sensor, the control circuit further including a signal receiving means and a memory for storing a commanded pressure signal, the control circuit actuating the servo to open the valve when the pressure sensor indicates a tire pressure of greater than the commanded pressure; and
    a master control unit adapted to transfer the commanded pressure signal to the control circuit through a transmission means;
    wherein the servo has at least three positions and the valve has at least three positions, the valve also in fluid communication with compressed gas within a gas supply tank, the valve adapted for bleeding gas out of the tire and into the ambient atmosphere in a first position corresponding to a first servo position, for bleeding gas out of the gas supply tank and into the tire in a second position corresponding to a second servo position, and for sealing the gas within the tire and within the gas supply tank in a third, closed position corresponding to a third servo position; the control circuit actuating the servo to assume the first servo position when the pressure sensor indicates a tire pressure of greater than the commanded pressure, to assume the second servo position when the pressure sensor indicates a tire pressure of less than the commanded pressure, and to assume the third servo position when the pressure sensor indicates a tire pressure substantially at the commanded pressure.

12. The tire pressure control system of claim 11, wherein the wheel is fixed to a live axle, and the gas supply tank is fixed inside the live axle.

13. The tire pressure control system of claim 11 wherein the wheel is fixed to a live axle, the live axle being substantially hollow and gas-impermeable, and itself forms the gas supply tank.

14. The tire pressure control system of claim 11, wherein the master control unit includes at least two channels for sending two independent commanded pressure signals to servo systems mounted to wheels on at least two sides of a vehicle.

15. The tire pressure control system of claim 11, wherein the master control unit includes at least four channels for sending four independent commanded pressure signals to servo systems mounted to at least four wheels of a vehicle.

16. The tire pressure control system of claim 11, wherein the transmission means is a radio signal transmission means.

17. The tire pressure control system of claim 11, wherein the transmission means is a magnetic coupling signal transmission means.

18. The tire pressure control system of claim 11, wherein the transmission means is an ultrasonic signal transmission means.

19. The tire pressure control system of claim 11, wherein the transmission means is an optical signal transmission means.

20. The tire pressure control system of claim 11, wherein the transmission means is a wire and the master control unit is fixed to the tire.

* * * * *